(12) United States Patent
Sakayori

(10) Patent No.: US 6,400,691 B2
(45) Date of Patent: *Jun. 4, 2002

(54) ATM SWITCHING EQUIPMENT AND DATA EDITING SYSTEM

(75) Inventor: Hitoshi Sakayori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/833,535

(22) Filed: Apr. 12, 2001

Related U.S. Application Data

(63) Continuation of application No. 09/047,154, filed on Mar. 24, 1998, now Pat. No. 6,226,293.

(30) Foreign Application Priority Data

Oct. 17, 1997 (JP) ............................................. 9-285839

(51) Int. Cl.$^7$ .................................................. H04J 3/14
(52) U.S. Cl. ........................ 370/252; 370/235; 370/241; 370/389; 370/395.2
(58) Field of Search ................................. 370/229, 232, 370/233, 234, 241, 242, 243, 244, 245, 246, 252, 253, 395, 389, 412, 395.2, 395.21, 395.3, 395.51

(56) References Cited

U.S. PATENT DOCUMENTS

| | | | |
|---|---|---|---|
| 5,345,445 A | 9/1994 | Hiller et al. | |
| 5,715,237 A | * 2/1998 | Akiyoshi | 370/229 |
| 5,771,231 A | 6/1998 | Watanabe | |
| 5,802,131 A | 9/1998 | Morzano | |
| 5,966,509 A | 10/1999 | Abe et al. | |
| 5,974,046 A | 10/1999 | Kim et al. | |
| 6,141,326 A | * 10/2000 | Minami | 370/229 |
| 6,226,293 B1 | * 5/2001 | Sakayori | 370/395 |

FOREIGN PATENT DOCUMENTS

JP 08331138 A 12/1996

* cited by examiner

*Primary Examiner*—Douglas Olms
*Assistant Examiner*—Shick Hom
(74) *Attorney, Agent, or Firm*—Katten Muchin Zavis Rosenman

(57) ABSTRACT

An ATM switching equipment involves the use of a data editing terminal different from a central controller to easily efficiently collect data on a transmission path. Each component device generates an Operations, Administration, and Maintenance OAM cell having traffic data and performance monitor data as internal information without providing a new device as the one for inputting the data to the data editing terminal. The traffic data and the performance monitor data of all the devices are automatically simultaneously inputted at a high speed to the data editing terminal by routing the OAM cell to the data editing terminal connected to an ATM switch of the same switching equipment. The data required can be displayed at any time periodically or in response to a request from a maintenance man in the data editing terminal.

11 Claims, 11 Drawing Sheets

FIG.5

| B7 | B6 | B5 | B4 | B3 | B2 | B1 | B0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| GFC/VPI | | | | VPI | | | |
| VPI | | | | VCI | | | |
| VCI | | | | | | | |
| VCI | | | | PTI | | | CLP |
| OAM CELL TYPE | | | | FUNCTION TYPE | | | |
| VPI OF CONNECTION OF MEASUREMENT OBJECT CONNECTION | | | | | | | |
| MEASUREMENT OBJECT VPI | | | | MEASUREMENT OBJECT VCI | | | |
| VCI OF MEASUREMENT OBJECT CONNECTION | | | | | | | |
| MEASUREMENT OBJECT VCI | | | | (DON'T CARE) | | | |
| SEFS-S MEASURED VALUE | | | | | | | |
| CV-S MEASURED VALUE | | | | | | | |
| (HEREINAFTER PERFORMANCE MONITOR DATA MEASURED VALUE) | | | | | | | |
| NUMBER OF TRANSMISSION USER CELLS (CLP=0,Up) | | | | | | | |
| NUMBER OF TRANSMISSION USER CELLS (CLP=0,D) | | | | | | | |
| (HEREINAFTER TRAFFIC COLLECTION DATA) | | | | | | | |
| CRC-10 | | | | | | | |

FIG.6

| CELL-IN SIDE | CELL-OUT SIDE |
|---|---|
| OE1-VP1-VC1 | OEA-VPA-VCA |
| OE2-VP2-VC2 | OEA-VPA-VCB |

FIG.7

| CELL-IN SIDE | ROUTING DEVICE 1 (TAG-A1ST) | ROUTING DEVICE 2 (TAG-A2ND) | ROUTING DEVICE 3 (TAG-A3RD) | CELL-OUT SIDE |
|---|---|---|---|---|
| OE1-VP1-VC1 | DEVICE A | DEVICE B | OEA | OEA-VPA-VCA |
| OE2-VP2-VC2 | DEVICE C | DEVICE D | OEA | OEA-VPA-VCB |

FIG.9

| OBJECT CLASS (LAYER) | COLLECTION ITEMS | MEANINGS | REMARKS |
|---|---|---|---|
| OPTICAL SPI TTP BIDIRECT -IONAL CURRENT DATA (OPTICAL LEVEL) | LASER BIAS CURRENT (LBC) | | ENHANCE 1ST HARDWARE NOT PROVIDED |
| | OPTICAL POWER TRANSMITTED | OPTICAL MODULE TRANSMITTED LIGHT LEVEL STEADY MEASUREMENT | |
| | OPTICAL POWER RECEIVED | OPTICAL MODULE RECEIVED LIGHT LEVEL STEADY MEASUREMENT | |
| RS CURRENT DATA (SECTION) | SECTION SEVERELY ERRORED SECONDS (SEFS-S) | SEF ERRORED SECONDS | |
| | SECTION CODING VIOLATION (CV-S) | NUMBER OF SECTION BIP ERRORS | |
| | SECTION ERRORED SECONDS (ES-S) | CV-S$\geq$1, SEF ERROR$\geq$1, LOS ERRORED or +1' | |
| | SECTION SEVERELY ERRORED SECONDS (SES-S) | CV$\geq$CV-Ss, SEF ERROR$\geq$1, LOS ERRORED or +1' | CV-Ss:SES-S THRESHOLD VALUE |
| | ESA(?) | REQUEST ITEM ON OSI DOCUMENT ENHANCE 1ST HARDWARE NOT PROVIDED | |
| | ESB(?) | | |

FIG.10

| OBJECT CLASS (LAYER) | COLLECTION ITEMS | MEANINGS | REMARKS |
|---|---|---|---|
| MS CURRENT DATA (LINE) | NEAR END LINE CODING VIOLATION(CV-L) | NUMBER OF NEAR END LINE ERRORS | |
| | NEAR END LINE ERRORED SECONDS (ES-L) | CV-L≧1, AIS-L ERRORED or +1' | |
| | NEAR END LINE SEVERELY ERRORED SECONDS(SES-L) | CV-L≧CV-Ls SEF ERROR≧1, LOS ERRORED or -1' | CV-Ls:SES-L THRESHOLD VALUE |
| | NEAR END LINE UNABALABLE SECONDS(UAS-L) | SES-Ls OCCURRENCE SECONDS. DETECTING PROTECTION INCLUDED, RESTORING PROTECTION NOT INCLUDED | PROTECTION TIME:10[S] |
| | AISS(?) | REQUEST ITEM ON OSI DOCUMENT, ENHANCE 1ST HARDWARE NOT PROVIDED | |
| | ESA(?) | | |
| | ESB(?) | | |
| | NEAR END LINE FAILURE COUNT(FC-L) | AIS FAILURE SECONDS | |
| | FAR END LINE CODING VIOLATION(CV-LFE) | NUMBER OF FAR END LINE BIP ERRORS | |
| | FAR END LINE ERRORED SECONDS(ES-LFE) | CV-LFW≧1, RDI-L ERRORED or +1' | |
| | FAR END LINE SEVERELY ERRORED SECONDS(SES-LFE) | CV-L≧CV-Ls, SEF ERROR≧1, LOS ERRORED or +1' | CV-LFEs:SES-LFE THRESHOLD VALUE |
| | FAR END LINE UNABALABLE SECONDS(UAS-LFE) | RDI-L FAILURE SECONDS | |
| | FAR END LINE FAILURE COUNT(FC-LFE) | SES-LFEs OCCURRENCE SECOND. DETECTING PROTECTION INCLUDED, RESTORING PROTECTION NOT INCLUDED | PROTECTION TIME:10[S] |
| PS CURRENT DATA | PROTECTION SWITCHING COUNTS(PSC) | NUMBER OF SWITCHING TO PROTECTION LINE | COUNTED BY SOFTWARE OR COMMON UNIT |
| | PROTECTION SWITCHING DULATION(PSD) | PROTECTION LINE USING SECONDS | |
| VC CURRENT DATA (STS PATH) | PATH CODING VIOLATION (CV-P) | NUMBER OF PATH BIP ERRORS | |
| | PATH ERRORED SECONDS (ES-P) | CV-P≧1, AIS-P ERROR, LOP-P ERROR, SLM-P ERROR or | |
| | PATH SEVERELY ERRORED SECONDS(SES-P) | CV-P≧CV-Ps, AIS-P ERROR, LOP-P ERROR, SLM-P ERROR or | CV-Ps:SES-P THRESHOLD VALUE |

FIG.11

| OBJECT CLASS (LAYER) | COLLECTION ITEMS | MEANINGS | REMARKS |
|---|---|---|---|
| VC CURRENT DATA (STS PATH) | PATH UNABALABLE SECONDS (UAS-P) | SES-Ps OCCURRENCE SECONDS. DETECTING PROTECTION INCLUDED, RESTORING PROTECTION NOT INCLUDED | PROTECTION TIME:10[S] |
| | ESA(?) | REQUEST ITEM ON OSI DOCUMENT, ENHANCE 1ST HARDWARE NOT PROVIDED | |
| | ESB(?) | | |
| | AIS AND LOPS(?) | | |
| | PATH FAILURE COUNT (FC-P) | LOP-P, AIS-P, SLN-P FAILURE SECONDS | |
| | FAR END PATH CODING VIOLATION (CV-PFE) | NUMBER OF FAR END LINE BIP ERRORS | |
| | FAR END PATH ERRORED SECONDS (ES-PFE) | CV-PEF≧1, RDI-P ERRORED or +1' | |
| | FAR END PATH SEVERELY ERRORED SECONDS(SES-PFE) | CV-P≧CV-PFEs, RDI-P ERROR≧1 | CV-PEs:SES-PFE THRESHOLD VALUE |
| | FAR END PATH UNABALABLE SECONDS (UAS-PFE) | SES-PFEs OCCURRENCE SECONDS. DETECTING PROTECTION INCLUDED, RESTORING PROTECTION NOT INCLUDED | PROTECTION TIME:10[S] |
| | ESAFE | REQUEST ITEM ON OSI DOCUMENT, ENHANCE 1ST HARDWARE NOT PROVIDED | |
| | ESEFE | | |
| | FAR END PATH FAILURE COUNT (FC-PFE) | RDI-P FAILURE OCCURRENCE SECONDS | |
| PJ CURRENT DATA | STS POINTER JUSTIFICATIONS (PJs) | DIFFERENCE BETWEEN OUTGOING PJs NUMBER AND INCOMING PJs NUMBER | 1ST HARDWARE NOT PROVIDED |

FIG.12

| NUMBER | COUNT ITEMS | | COUNT | DIRECTION |
|---|---|---|---|---|
| 1 | NUMBER OF TRANSMISSION USER CELLS | (CLP=0) | 32×2 | U/D |
| 2 | NUMBER OF TRANSMISSION USER SELLS | (CLP=1) | 32×2 | U/D |
| 3 | NUMBER OF TRANSMISSION E TO E OAM CELLS | (CLP=0) | 32×2 | U/D |
| 4 | NUMBER OF TRANSMISSION E TO E OAM CELLS | (CLP=1) | 32×2 | U/D |
| 5 | NUMBER OF TRANSMISSION SEGMENT OAM CELLS | (CLP=0) | 32×2 | U/D |
| 6 | NUMBER OF TRANSMISSION SEGMENT OAM CELLS | (CLP=1) | 32×2 | U/D |
| 7 | NUMBER OF TRANSMISSION EFCI-ATTACHED CELLS | (CLP=0) | 16×2 | U/D |
| 8 | NUMBER OF TRANSMISSION EFCI-ATTACHED CELLAS | (CLP=1) | 16×2 | U/D |
| 9 | NUMBER OF VIOLATING USER CELLS OF CLP=0 UPC UNIT | (CLP=0) | 32×2 | Up |
| 10 | NUMBER OF DISPOSAL USER CELLS OF CLP=d.c UPC UNIT | (CLP=1) | 32×2 | Up |
| 11 | NUMBER OF DISPOSAL USER CELLS OF CLP=d.c UPC UNIT | (CLP=1) | 32×2 | Up |
| 12 | NUMBER OF VIOLATING E TO E OAM CELLS OF CLP=0 ULP UNIT | | 16×2 | Up |
| 13 | NUMBER OF DISPOSAL E TO 2 OAM CELLS OF CLP=d.c UPC UNIT | (CLP=0) | 16×2 | Up |
| 14 | NUMBER OF DISPOSAL E TO E OAM CELLS OF CLP=d.c UPC UNIT | (CLP=1) | 16×2 | Up |
| 15 | NUMBER OF VIOLATING SEGMENT OAM CELLS OF CLP=0 UPC UNIT | | 16×2 | Up |
| 16 | NUMBER OF DISPOSAL SEGMENT OAM CELLS OF CLP=d.c ULP UNIT | (CLP=0) | 16×2 | Up |
| 17 | NUMBER OF DISPOSAL SEGMENT OAM CELLS OF CLP=d.c UPC UNIT | (CLP=1) | 16×2 | Up |
| 18 | NUMBER OF INFLOW/OUTFOLOW USER CELLS | (CLP=0) | 32×2 | U/D |
| 19 | NUMBER OF INFLOW/OUTFOLOW USER CELLS | (CLP=1) | 32×2 | U/D |
| 20 | NUMBER OF INFLOW/OUTFOLOW E TO E OAM CELLS | (CLP=0) | 32×2 | U/D |
| 21 | NUMBER OF INFLOW/OUTFOLOW E TO E OAM CELLS | (CLP=1) | 32×2 | U/D |
| 22 | NUMBER OF INFLOW/OUTFOLOW SEGMENT OAM CELLS | (CLP=0) | 32×2 | U/D |
| 23 | NUMBER OF INFLOW/OUTFOLOW SEGMENT OAM CELLS | (CLP=1) | 32×2 | U/D |
| 24 | NUMBER OF NON-SET CELLS ARRIVED | | 32×1 | U/D |

ATM SWITCHING EQUIPMENT AND DATA EDITING SYSTEM

This application is a continuation of U.S. application Ser. No. 09/047,154, filed Mar. 24, 1998, now U.S. Pat. No. 6,226,293.

BACKGROUND OF THE INVENTION

The present invention relates to a technique of automatically collecting traffic data and performance monitor data on a transmission path in a component device such as a user network interface and a network node interface of an ATM switching equipment.

In an ATM switching equipment for switching and transferring inter-user and inter-network information in the form of cells, each of intra switching equipment component device such as a user network interface (UNI) device and a network node interface (NNI) device, measures traffic data about the number of transmission cells and the number of disposal cells etc on the unit of connection set in the above device or on the unit of each device, and measures performance monitor data about a bit error rate etc on the unit of each device. It is generally requested that these pieces of measured data be tabulated with a predetermined period, and that a result thereof be outputted and displayed in response to a request from a maintenance man.

Those pieces of traffic data and the performance monitor data have hitherto been temporarily collected within each component device, and fetched, edit-processed, outputted and displayed by software in a central controller with the predetermined period or every time the maintenance man makes the request.

A numerical quantity of the respective component devices such as the user network interfaces and the network node interfaces which are accommodated in the single switching equipment, ranges from several tens to several hundreds of units. It is a comparatively large burden on the software of the central processing unit to fetch the data from all the devices within the 15 period that are used in a normal operation, and there must be a possibility of causing a decline especially in terms of a throughput of a call process executed by the same software. Further, alternatively there might arise a problem in which the data can not fetched out from all the devices within the 15 period.

To obviate this problem, there is a method of separately providing a device for exclusively executing processes of collecting and editing the traffic data and the performance monitor data (which device is hereinafter simply called a data editing terminal) separately from the central controller. In order to input the traffic data and the performance monitor data to the data editing terminal from each component device, however, it is required that a data transferring unit similar to the method of inputting the data to the conventional central controller be newly provided between each component device and the data editing terminal.

SUMMARY OF THE INVENTION

According to the present invention, a data editing terminal different from a central controller is used. Each component device generates an OAM cell having traffic data and performance monitor data as internal information without providing a new device as the one for inputting the data to the data editing terminal. The traffic data and the performance monitor data of all the devices are automatically simultaneously inputted at a high speed to the data editing terminal by routing the OAM cell to the data editing terminal connected to an ATM switch of the same switching equipment. The data required can be displayed at any time periodically or in response to a request from a maintenance man in the data editing terminal.

According to a first aspect of the present invention, an ATM switching equipment has a component device for transmitting and switching an ATM cell of said ATM switching equipment. The ATM switching equipment comprises a performance monitor data counting unit of counting performance monitor data about a connection of a transmission path, a traffic data counting unit for counting traffic data about the connection of the transmission path, and a data editing unit for editing the data from the performance monitor data counting unit and from the traffic data counting unit.

The component device herein implies, e.g., a user network interface (UNI) so constructed as to be capable of counting by itself the performance monitor data and the traffic data.

According to a second aspect of the invention, the ATM switching equipment according to the first aspect of the invention further comprises a cell editing unit for storing the data edited by the data editing unit in a fixed cell format.

The data tabulated by the component device such as the user network interface etc are thereby transmitted within the ATM switch in accordance with a specified cell format (e.g., an OAM cell) and circulated as edited data.

According to a third aspect of the present invention, in the ATM switching equipment according to the first or second aspect of the invention, further comprises a timer unit, and the data editing unit collects the data at an interval of a fixed time.

The tabulated data are thereby periodically sent to the outside in the cell format.

According to a fourth aspect of the invention, a data editing system of an ATM switching equipment, in addition to the ATM switching equipment according to the second aspect of the invention, comprises a data editing terminal connected via a user network interface to the ATM switching equipment. The data editing terminal reads an information field of an OAM cell received from the ATM switching equipment, edits the information field and displays an edited result on a display terminal provided in the system periodically or in response to a request from an operator of the system.

The data collected by the component device such as the user network interface etc are thereby easily edited and displayed on the data editing terminal via a normal transmission path.

BRIEF DESCRIPTION OF THE DRAWINGS

Other objects and advantages of the present invention will become apparent during the following discussion in conjunction with the accompanying drawings, in which:

FIG. 5 is a diagram illustrating a format of an OAM cell in the embodiment;

FIG. 6 is an explanatory diagram showing how routing is done in the embodiment;

FIG. 7 is an explanatory diagram showing intra switching equipment routing in the embodiment;

FIG. 9 is an explanatory diagram (1) showing performance monitor data items in the embodiment;

FIG. 10 is an explanatory diagram (2) showing the performance monitor data items;

FIG. 11 is an explanatory diagram (3) showing the performance monitor data items in the embodiment; and FIG. 12 is an explanatory diagram showing traffic data items in the embodiment.

DETAILED DESCRIPTION OF THE PREFERRED EMBODIMENT

An embodiment of the present invention will hereinafter be described with reference to the accompanying drawings.

To start with, an outline of the present invention will be explained with reference to FIGS. 1–3.

A data editing terminal 1 is connected to a user network interface (UNI: designated herein by OE-A in FIGS. 1–3), and includes hardware and software that are capable of editing input data from this user network interface (UNI: OE-A).

What can be used as the data editing terminal 1 is a terminal connected to the user network interface (UNI) of the ATM switching equipment via a B-ISDN terminal adaptor (B-TA).

Figure 1:
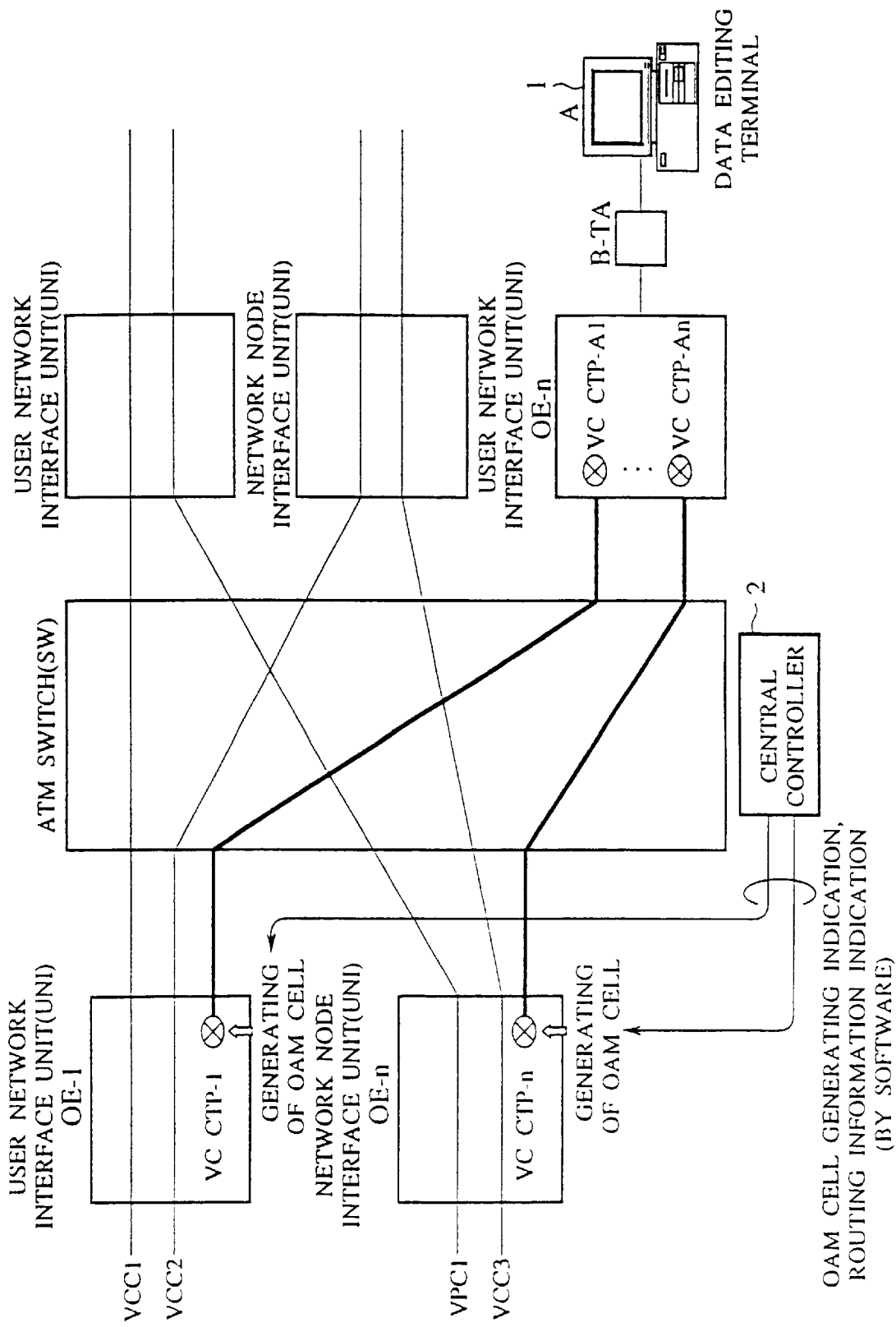
FIG. 1 is an explanatory diagram showing an outline of the present invention.
Figure 2:
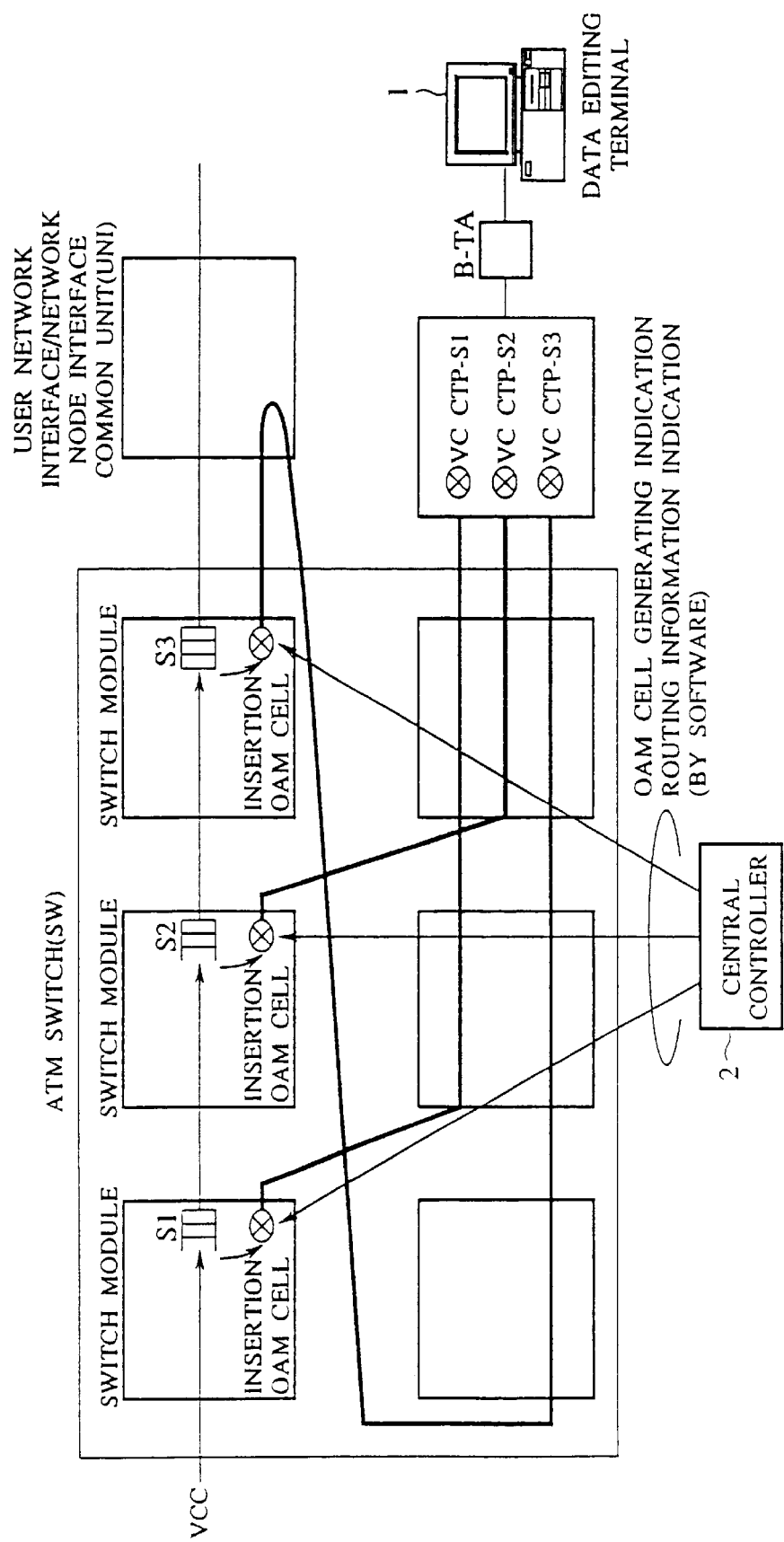
FIG. 2 is an explanatory diagram showing an applied example of the present invention.

Note that the symbols OE-1 to OE-n and the symbols S1, S2, S3 in FIG. 2 represent component devices within the ATM switching equipment. To be specific, FIG. 1 shows a case in which the user network interface (UNI) serves as a component device. FIG. 2 shows a case where a switch module in the ATM switch (SW) serves as a component device. In any case, the same construction of the device may be adopted.

Among those component equipments, OE-1 to OE-n in FIG. 1 designate the user network interfaces (UNI) and also network node interfaces accommodated in the ATM switching equipment. The symbols S1, S2, S3 in FIG. 2 designate the component devices within the switch modules constituting the ATM switch (SW).

Figure 3:
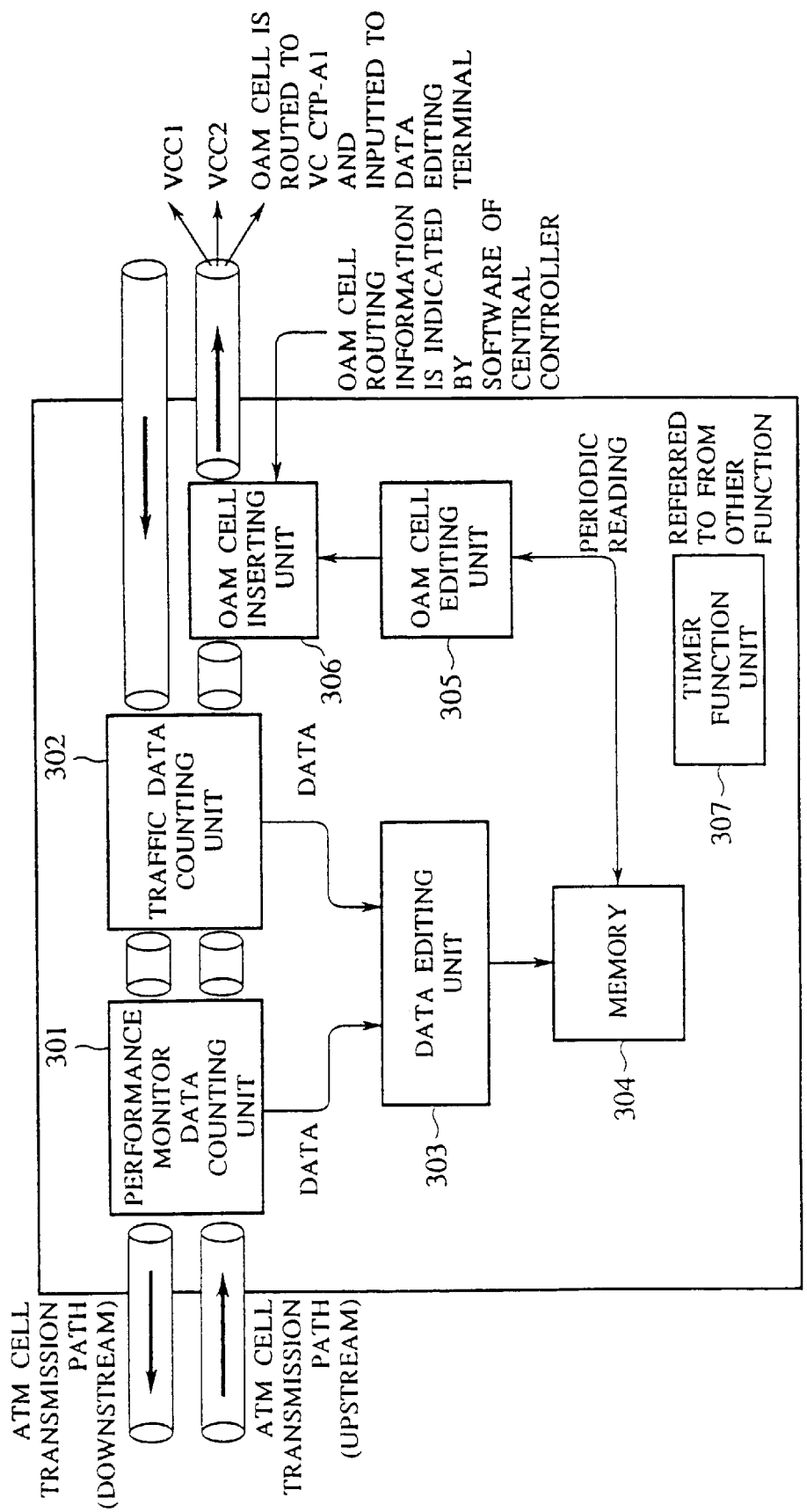
FIG. 3 is a function block diagram of a component device (a user network interface: OE-1) in the embodiment.

FIG. 3 shows an internal functional construction of OE-1 of the user network interface (UNI) by way of one example of the component device.

A performance monitor data counting unit 301 provided on each of ATM cell transmission paths ("upstream" and "downstream"), and incorporates a function of integrating and tabulating performance monitor data such as a bit error ratio for a fixed period of time. Further, a traffic data counting unit 302 has a function of counting traffic data about the number of transmission cells and the number of disposal cells, and integrating and tabulating the results thereof for a fixed period of time per connection.

The performance monitor data and the traffic data are written to a memory 304 via a data editing unit 303 provided by firmware.

The traffic data and the performance monitor data, which have been thus integrated and tabulated for the fixed period of time and then written to the memory, are periodically read by a timer function 307, and data thereof are edited by an OAM cell editing unit 305 and further edited within an OAM cell information field through an OAM cell inserting unit 306.

Note that details of an OAM will be explained later on.

Further, the component device has been explained by exemplifying OE-1 of the user network interface (UNI), however, other component devices have the same construction.

Virtual channel terminating points (VC, CTP-1, VC CTP-AN, VC CTP-S1, VC CTP-S3 in FIGS. 1 and 2) are set 2 within the user network interface (UNI) to which the data editing terminal 1 is connected under software control by a central controller 2.

Then, the central controller 2 sets routing information of the OAM cell so that the OAM cell generated as described above can reach one of the virtual channel terminating points in the user network interface (UNI) to which the data editing terminal 1 is connected in each component device.

Then, the central controller 2 similarly gives an indication to insert the relevant OAM cell into the cell transmission path of the ATM switch. Incidentally, after being once indicated to insert the CAM cell, the insertion of the OAM cell is automatically periodically carried out till the central controller 2 gives an indication to stop the insertion.

With the construction described above, when the central controller 2 indicates each of the component devices to insert the OAM cell as shown above, the CAM cell is thereafter periodically inputted to the data editing terminal 1 from each component device via a route shown by a bold line in FIGS. 1 and 2. Then, it follows that the software in the data editing terminal 1 edits these pieces of input data, and displays an edited result periodically or every time a request is made by a maintenance man.

Figure 4:
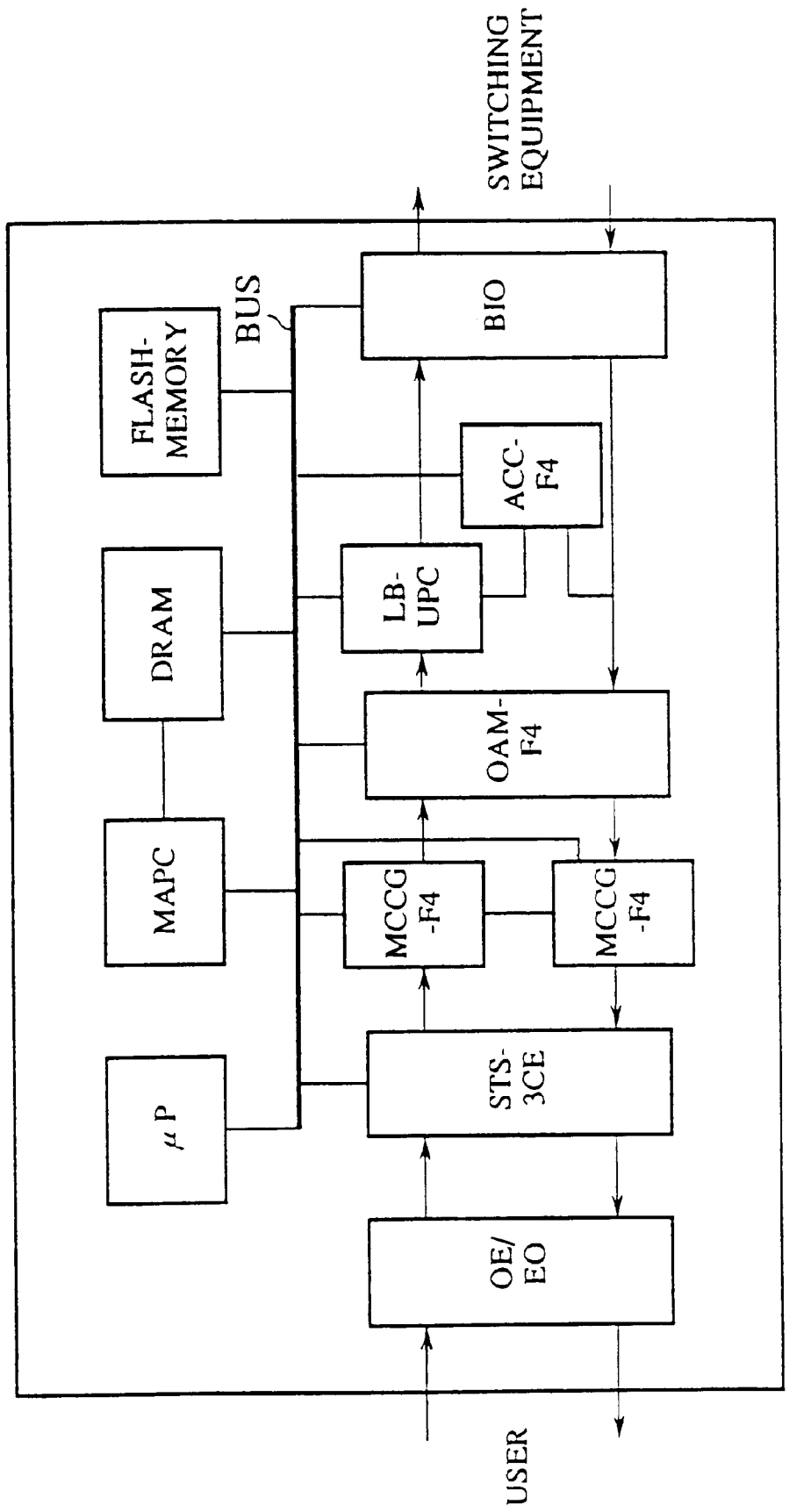
FIG. 4 is a hardware block diagram showing the user network interface in the embodiment.

FIG. 4 is a hardware block diagram showing the user network interface (UNI) for actualizing the functions shown in FIG. 3.

The hardware is constructed centering a bus (BUS) controlled by a microprocessor ($\mu$P), to which a boot program storing memory (FLASH-MEMORY) stored with a boot program for booting the system is connected. Further, a general-purpose memory (DRAM) is connected thereto via a microprocessor peripheral controller (MAPCC).

Referring to FIG. 4, the symbol OE/EO denotes an opto-electric converting unit functioning as an interface for converting an optical signal transmitted via an optical fiber of a user line into an electric signal. STS-3CE functioning as the performance monitor data counting unit 301 in FIG. 3, extracts the ATM cell and collects the performance monitor data.

MCCG-F4 executes an OAM-PM cell process which will be mentioned later on, i.e., counts the number of cells. Further, OAM-F4 extracts and inserts the OAM cell, and executes a process of an OAM alarm cell, a process of loop-back cell as well as managing a status of the alarm.

LB-UPC controls a user parameter, and detects nd disposes of the cell violating the above.

ACC-F4 functioning as the traffic data counting unit in FIG. 3, counts the number of the transmission/disposal cells, and collects the traffic data.

BIO is defined as an interface between the user network interface (UNI) and the switching equipment.

FIG. 5 shows a format of the OAM cell used in this embodiment.

As header information, there are newly defined "0008h" in VPI, "7h" in PTI, "9h" in OAM CELL TYPE and "0h" in FUNCTION TYPE.

Figure 8:
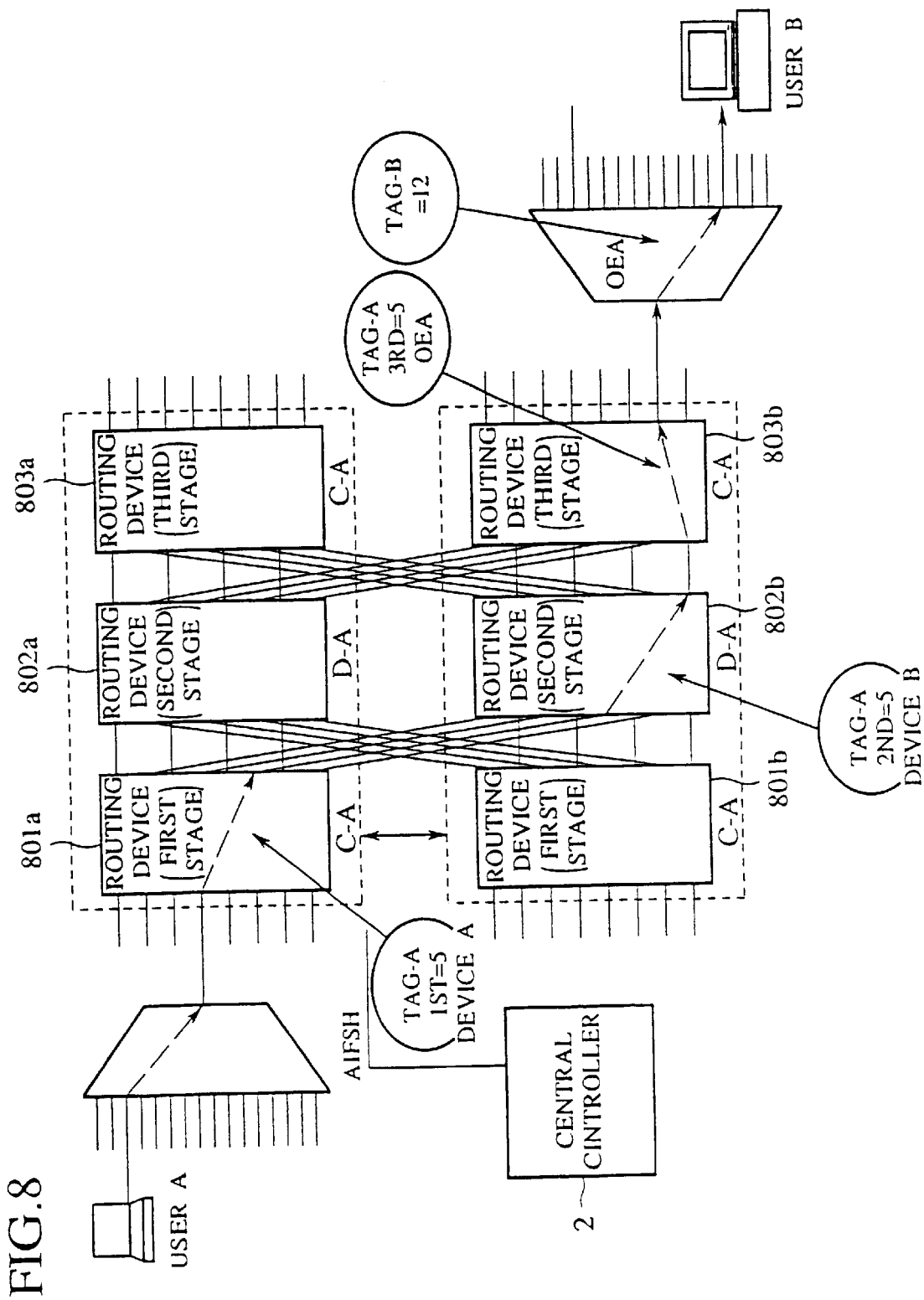
FIG. 8 is an explanatory diagram illustrating how the cell routing is structured in the embodiment.

FIG. 8 is an explanatory diagram showing a concept of the cell routing, wherein the cell routing from a user A to user B is effected through a 2-row 3-stage switch (SW).

A procedure of automatically sending the OAM cell will be explained based on such a construction.

To begin with, a command inputted by the maintenance man indicates, to the software of the central controller 2, routing which shows a cell-in device and a cell-out device as shown in a routing table of FIG. 6.

The software of the central controller 2 which has received the indication determines the routing information in the routing table within the switching equipment shown in FIG. 7 with reference to the routing data in an unillustrated main storage device, an notifies the cell-in device hardware of this piece of information.

The cell-in hardware notified of the above information reads a value of VPI-VCI written to the header information of the cell inputted via the transmission path, and seeks a row of VPI-VCI with the same cell-in information by retrieving FIG. 7. Upon detecting the relevant row, the routing information (TAG-A1st, TAG-A2nd, TAG-A3rd) shown in this row are added to the header part of the cell, and the relevant cell is sent to a next routing device.

To explain it by way of a specific example, to begin with, when the cell-in device (OE1) receives the cell, if turned out to be a value of VPI-VCI from the header information of that cell, this is coincident with a 1st row in FIG. 7, and hence TAG-A1st, TAG-A2nd, TAG-A3rd are added to the header of the cell. Then, the cell is sent to a next routing device.

Each routing device, upon receiving the cell from the transmission path, reads the routing information written to the header thereof and transmits the relevant cell to a next routing device. The cell is transmitted finally to a cell-out device by repeating this process.

For example, referring to FIG. 2, the header of the cell received by a routing device 801a is read, and, if TAG-A1st information thereof indicates a device A (802b), this cell is transmitted to the device A (802b) defined as one of the routing devices. The header information of the received cell is read in the device A (802b), and, if TAG-A2nd information indicates the device B (803b), this cell is transmitted to the device B (803b) defined as one of the routing devices. The same process is executed in the device B (803b), and the cell is transmitted to a cell-out device OEA on the basis of TAG-A3rd.

In the cell routing described above, the command from the maintenance man indicates the user network interface OE-1 to start the generation and insertion of the OAM cell, thereby executing the process which follows.

At first, the interface OE-1 receiving the indication periodically generates the OAM cells under the control of the microprocessor ($\mu$p).

At this time, "TAG-A1st=Device A (802b), TAG-A2nd=Device B (803b), TAG-A3rd=Cell-Out Device OEA" is, as explained in FIG. 7, written as a piece of header information to the header part. Further, the OAM cell header information is written in a file format shown in FIG. 5, and the performance monitor data and the traffic data stored in the general-purpose memory (DRAM) are read and written to the OAM cell. This OAM cell is inserted into the cell transmission path via OAM-F4 (see FIG. 4).

The OAM cell inserted into the transmission path is transmitted to the cell-out device (OEA-VPA-VCA) to which the data editing terminal 1 is connected in accordance with the intra switching equipment routing table (FIG. 7) as described above.

Next, a procedure of collecting the data will be discussed with reference to FIG. 4.

(Collection of Performance Monitor Data)

STS-SCE monitors the cell occurred on the cell transmission path, and calculates a measurement value of each of items sown in FIGS. 9–11 with a, e.g., 15-min period. Then, STS-3CE stores the general-purpose memory (DRAM) with measurement results about those items at the interval of 15 min.

(Collection of Traffic Data)

LB-UPC in FIG. 4, each time the cell occurs on the cell transmission path, or each time there occurs an event that should be observed in a UP-direction (upstream direction: user→switching equipment direction) shown in FIG. 12, accumulates the number of occurrences of each event and informs ACC-F4 of it, which monitors LB-UPC. Further, ACC-F4 monitors the transmission path in a DOWN direction (downstream direction: switching equipment→user direction), and accumulates the number of occurrences of the event every time the event that should be observed in this direction occurs. Then, the general-purpose memory (DRAM) is stored with a result of accumulation with a 15-min period.

The performance monitor data and the traffic data thus stored in the general-purpose memory (DRAM are written to the OAM cell generated at the interval of 15 min and transmitted under the control of the microprocessor ($\mu$P).

The data editing terminal 1, when receiving the OAM cell via the user network interface OE-1 at the interval of 15 min, reads the data in the relevant cell format and obtains a performance monitor data value observed and a traffic data measured.

The software in the data editing terminal 1 edits the data obtained from the relevant OAM cell into an easy-to-see format such as a table display etc, and displays the data on a display unit (VDU) in response to a request from the maintenance man.

According to the present invention, it is feasible to automatically input the traffic data and the performance monitor data of all the component devices simultaneously at a high speed without providing a new device as the one for inputting the data to the data editing terminal. As a result, the data required can be displayed at any time periodically in the data editing terminal or in response to the request from the maintenance man.

It is apparent that, in this invention, a wide range of different working modes can be formed based on the invention without deviating from the spirit and scope of the invention. This invention is not restricted by its specific working modes except being limited by the appended claims.

What is claimed is:

1. An ATM switching equipment, which has a component device, for transmitting and switching an ATM cell of said ATM switching equipment, said component device comprising:
   first counting means for counting performance monitor data about a connection passing through said component device;
   second counting means for counting traffic data about said connection;
   data editing means for editing data from said first counting means and from said second counting means;
   means for generating an Operations, Administration, and Maintenance OAM cell which stores the data edited by said data editing means;
   means for setting a piece of routing information (TAG) in said OAM cell, and inserting said OAM cell into said connection.

2. The ATM switching equipment according to claim 1, further comprising:

a timer means, wherein said data editing means collects the data from said first counting means and from said second counting means at an interval of a predetermined time.

3. The ATM switching equipment according to claim 1, further comprising:

a data editing system comprising:

a data editing terminal connected via a user network interface to said ATM switching equipment, wherein said data editing terminal reads an information field of the Operations, Administration, and Maintenance OAM cell received from said ATM switching equipment, edits the information field and displays an edited result on a display terminal periodically or in response to a request from a operator of said editing system.

4. The ATM switching equipment according to claim 1, wherein said component device is a user network interface.

5. The ATM switching equipment according to claim 1, wherein said component device is a switch module constituting an ATM switch.

6. A switching equipment, which has a component device, for transmitting and switching a cell of said switching equipment, said component device comprising:

first counting means for counting performance monitor data about a connection passing through said component device;

second counting means for counting traffic data about said connection;

data editing means for editing data from said first counting means and from said second counting means;

means for generating a specified cell which stores the data edited by said data editing means;

means for setting a piece of routing information (TAG) in said specified cell, and inserting said specified cell into said connection.

7. The switching equipment according to claim 6, wherein the specified cell is an Operations, Administration, and Maintenance OAM cell.

8. The switching equipment according to claim 6, further comprising;

a timer means, wherein said data editing means collects the data from said first counting means and from said second counting means at an interval of a predetermined time.

9. The switching equipment according to claim 7, further comprising:

a data editing system comprising:

a data editing terminal connected via a user network interface to said switching equipment, wherein said data editing terminal reads an information field of the OAM cell received from said switching equipment, edits the information field and displays an edited result on a display terminal periodically or in response to a request from an operator of said data editing system.

10. The switching equipment according to claim 6, wherein said component device is a user network interface.

11. The switching equipment according to claim 6, wherein said component device is a switch module constituting a switch.

* * * * *

UNITED STATES PATENT AND TRADEMARK OFFICE
CERTIFICATE OF CORRECTION

PATENT NO.    : 6,400,691 B2
DATED         : June 4, 2002
INVENTOR(S)   : Hitoshi Sakayori It is certified that error appears in the above-identified patent and that said Letters Patent is hereby corrected as shown below:

Column 7,
Line 17, should read -- in response to request from an operator of said data editing system. --

Signed and Sealed this

Twenty-fifth Day of February, 2003

JAMES E. ROGAN
*Director of the United States Patent and Trademark Office*